United States Patent [19]
Suzuki

[11] Patent Number: 6,006,712
[45] Date of Patent: Dec. 28, 1999

[54] RESONATOR CONSTRUCTION FOR INTERNAL COMBUSTION ENGINE

[75] Inventor: Takehiro Suzuki, Shizuoka-ken, Japan

[73] Assignee: Suzuki Motor Corporation, Hamamatsu, Japan

[21] Appl. No.: 09/106,955

[22] Filed: Jun. 30, 1998

[30] Foreign Application Priority Data

Jun. 30, 1997 [JP] Japan .................................. 9-189152

[51] Int. Cl.$^6$ .......................... F02M 35/112; F01M 13/00
[52] U.S. Cl. .............. 123/184.57; 123/572; 123/184.53; 123/195 HC
[58] Field of Search ......................... 123/184.53, 184.57, 123/195 HC, 572

[56] References Cited

U.S. PATENT DOCUMENTS

| | | | |
|---|---|---|---|
| 5,005,553 | 4/1991 | Washizu et al. | 123/572 |
| 5,040,495 | 8/1991 | Harada et al. | 123/184.57 |
| 5,107,800 | 4/1992 | Araki et al. | 123/184.57 |
| 5,417,195 | 5/1995 | Tachikawa et al. | |
| 5,647,314 | 7/1997 | Matsumura et al. | 123/184.57 |

FOREIGN PATENT DOCUMENTS

| | | |
|---|---|---|
| 1-159125 | 11/1989 | Japan . |
| 5-272421 | 10/1993 | Japan . |
| 6-22558 | 3/1994 | Japan . |
| 409264142A | 10/1997 | Japan . |

*Primary Examiner*—Willis R. Wolfe
*Assistant Examiner*—Brian Hairston
*Attorney, Agent, or Firm*—Flynn, Thiel, Boutell & Tanis, P.C.

[57] ABSTRACT

A resonator structure which locates a resonator in a dead space inside an engine compartment, protects the resonator from vibration, and prevents a change in frequency due to oil mist residue in blow-by gas entering the resonator. In an internal combustion engine which is oriented horizontally in a vehicle engine compartment, an air cleaner outlet hose is provided in and connected to the downstream side of an air cleaner. The air cleaner outlet hose is connected to a throttle body, and the throttle body is connected to one end of a surge tank of an intake manifold, which intake manifold is provided at the rear side of the internal combustion engine. The resonator is located at the rear side of the air cleaner outlet hose, downstream from a bellows section of the air cleaner outlet hose, and also downstream from a breather pipe connecting section.

10 Claims, 5 Drawing Sheets

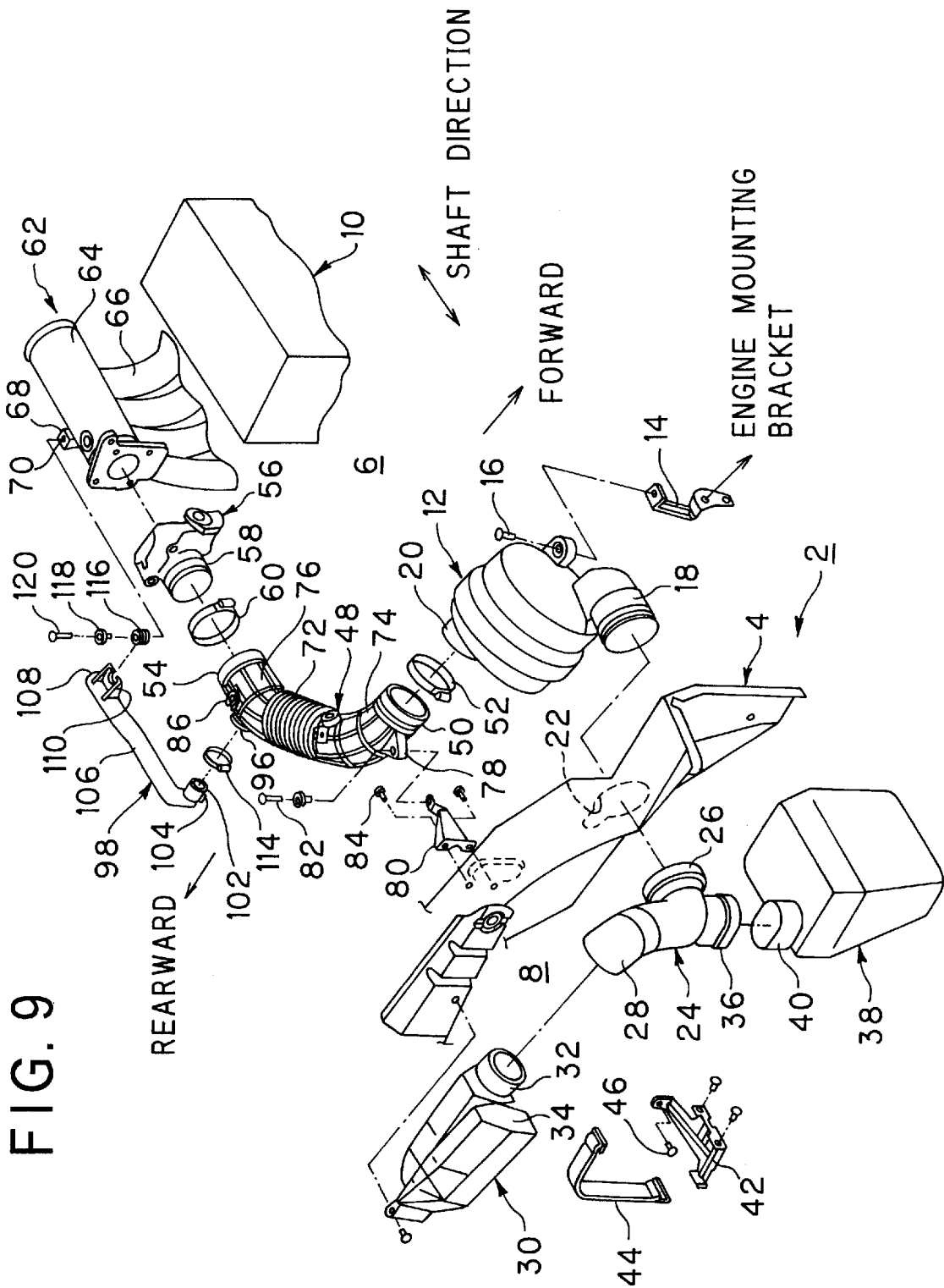

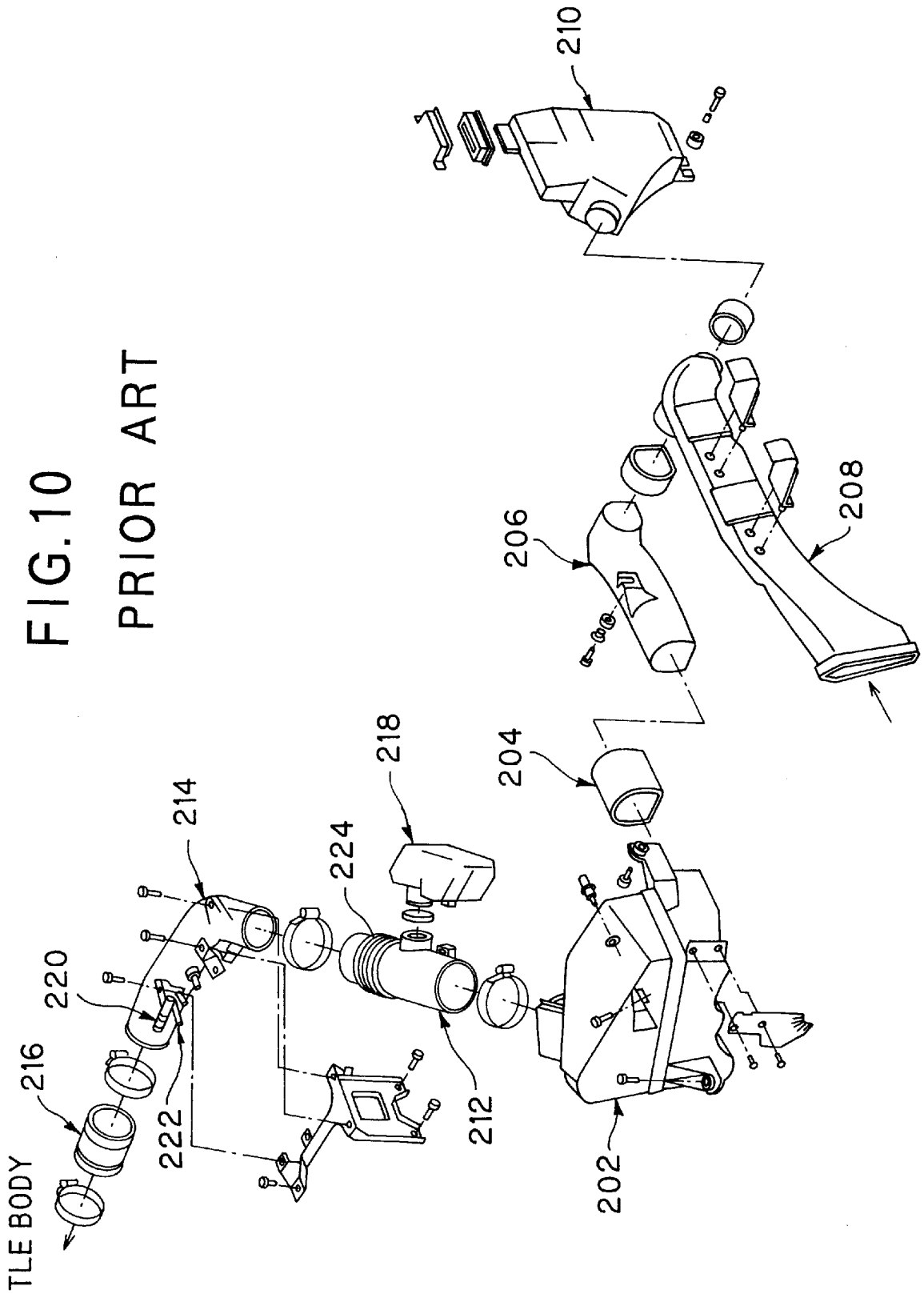

RESONATOR CONSTRUCTION FOR INTERNAL COMBUSTION ENGINE

FIELD OF THE INVENTION

The present invention relates to a resonator construction or structure for an internal combustion engine and, more particularly, to a resonator construction which makes effective use of dead space in an engine compartment or room. The resonator construction includes a resonator located in this dead space, which resonator is protected against vibrations generated by the internal combustion engine, and a change in frequency due to oil mist residue in blow-by gas which enters the resonator is prevented.

BACKGROUND OF THE INVENTION

An internal combustion engine mounted on a vehicle or the like typically has a resonator for reducing noises due to intake pulsing generated in an intake system by the introduction of air thereinto. A resonator construction for this type of internal combustion engine is shown in FIG. 10. In the figure, the reference numeral 202 indicates an air cleaner for an internal combustion engine located in an engine compartment of a vehicle (not shown).

The air cleaner 202 is provided by successively connecting thereto an air cleaner intake hose 204, an air cleaner intake pipe 206, and an air suction case 208 at the upstream side thereof. Air is introduced into the air cleaner 202 by the air suction case 208. The air suction case 208 has an upstream resonator 210 connected thereto.

Also, an air cleaner outlet hose 212, an air intake pipe 214, and an air intake hose 216 are successively connected to the air cleaner 202 at the downstream side thereof. The air intake hose 216 is connected to a throttle body (not shown in FIG. 10), and the throttle body is connected to a surge tank for an intake manifold (also not shown in FIG. 10).

Connected to the air cleaner outlet hose 212 is a downstream resonator 218. Connected to the air intake pipe 214 is a breather pipe 220 for introducing blow-by gas. The reference 222 indicates a cooling water pipe for cooling the breather pipe 220.

As described above, the internal combustion engine includes resonators 210, 218 connected at the respective upstream side and downstream side from the air cleaner 202 so as to control noise due to air intake pulsing. The resonator 218 connected at the downstream side of the air cleaner 202 is connected upstream from a bellows section 224 of the air cleaner outlet hose 212, as well as upstream from the breather pipe 220 connected to the air intake pipe 214.

Resonator constructions for internal combustion engines similar to that described above are disclosed in Japanese Patent Laid-Open Publication Nos. 1993-272421, 1989-159125, and 1994-22558.

The disclosure in Japanese Patent Laid-Open Publication No. 1993-272421 is realized by setting a relation between a drive frequency f1 of duty control for a control valve for adjusting a flow rate of a bypass route for bypassing a throttle valve and a specific number of vibrations f2 of an air intake route from an air cleaner to a throttle valve so that the relation therebetween will be as follows: $(3/4 \cdot f1 \leq f2 \leq (5/4) \cdot f1$, and by connecting a resonance chamber having a specific number of vibrations substantially equivalent to the drive frequency f1 to the air intake route between the air cleaner and the throttle valve.

The disclosure in Japanese Patent Laid-Open Publication No. 1989-159125 has an air intake device comprising a first independent air intake route branched from a surge tank extending in a specified direction and which communicates with each cylinder, a measurement chamber formed inside a bend section of this first independent air intake route, a second independent air intake route for communicating between this measurement chamber and the first independent air intake route, and a control valve for opening and closing this second independent air intake route. A port for introducing air into the surge tank and a communicating route for communicating between the surge tank and the measurement chamber are also provided, and this communicating route is provided in the surge tank along the direction to which the surge tank is extended as well as close to the inner side of the bend section of the first independent air intake route.

The disclosure in Japanese Patent Laid-Open Publication No. 1994-22558 is realized by attaching a resonator for suppressing pressure pulsing with a connecting edge thereof open to an intake manifold collector having an air cleaner at the upstream side thereof and with the downstream side thereof connected to a cylinder head.

In recent years, engine room space in vehicles has been reduced. For this reason, it is difficult to insure a space for placing a resonator 218 of a resonator construction for an internal combustion engine with the resonator 218 connected to the air cleaner outlet hose 212 at the downstream side of the air cleaner 202.

Also, when the resonator 218 is connected at the downstream side of the air cleaner 202, it is necessary to connect the resonator to the air cleaner outlet hose 212 at a location upstream from the bellows section 224 thereof, so that influence from vibrations propagated from the internal combustion engine over the resonator is avoided and any problems relating to the strength or effectiveness of the resonator will not occur.

However, it is sometimes the case in a resonator construction for a conventional type of internal combustion engine, that it is difficult to insure a space for a resonator 218 with a form largely projecting to the outside, in the engine room due to reduction of the space therein as described above. Further, the resonator cannot be connected upstream from the bellows section 224 of the air cleaner outlet hose 212, and in this case, noises due to intake pulsing cannot be reduced.

SUMMARY OF THE INVENTION

In order to minimize or eliminate the above-discussed inconveniences, the present invention includes an air cleaner outlet hose which is provided in and connected to the downstream side of an air cleaner for an internal combustion engine, which engine is oriented horizontally in an engine room of a vehicle. The air cleaner outlet hose is connected to a throttle body and the throttle body is connected to one edge of a surge tank of an intake manifold in the longitudinal direction thereof which is provided in the lateral direction of the vehicle at the rear side of the internal combustion engine. Further, each branch pipe of the intake manifold provided in the surge tank is connected to the internal combustion engine; and the resonator is located in and connected to the rear side of the air cleaner outlet hose, at the downstream side of a bellows section of the air cleaner outlet hose, and also at the downstream side of a breather pipe connecting section to which a breather pipe is connected.

The resonator is what is called a side branch type, and is provided with a cylindrical form having a substantially bent bottom section which extends from an opening at one end of the resonator to an intermediate section which extends along the rear side of the throttle body, and a block or end section at the other end of the resonator extends as far as the upper side of the surge tank and is placed thereon. A connecting section is provided at the one end of the resonator and is connected to a resonator connecting section located at the rear or downstream end of the air cleaner outlet hose downstream from a bellows section thereof, and also downstream from a breather pipe connecting section. A fixing section provided on the end section at the other end of the resonator is fixed to a resonator fixing section provided on the upper side of the surge tank through a floating or cushioning member.

The resonator is provided by connecting a resonator-side connecting section to a resonator connecting section provided in the rear side of the air cleaner outlet hose so that the resonator extends at an upward angle from the opening at the one end thereof toward the closed section at the other end thereof, and also by fixing a resonator-side fixing section to a resonator fixing section provided on the upper side of the surge tank.

In the resonator construction for the internal combustion engine according to the present invention, a resonator is located in the rear side of the air cleaner outlet hose connected to the downstream side from the air cleaner downstream from the bellows section, and also at the downstream side from the breather pipe connecting section, which allows the resonator to be located in a dead space in an engine room. In addition, a resonator-side connecting section at one edge of the resonator is connected to a hose-side connecting section of the air cleaner outlet hose, and a resonator-side fixing section at the other edge of the resonator is fixed to a tank-side fixing section of a surge tank through a floating member, which allows the resonator to be supported in its floating state. Further, a resonator-side connecting section is connected to a hose-side connecting section of the air cleaner outlet hose so that the resonator is placed at an angle upward from a opening section at one edge thereof toward a block section at the other edge, and a resonator-side fixing section is fixed to a body-side fixing section of the surge tank, which allows oil mist in blow-by gas flown into or entering the resonator to be prevented from remaining therein.

BRIEF DESCRIPTION OF THE DRAWINGS

Embodiments of the present invention are described hereinafter with reference to the related drawings, in which:

FIG. 9 is an exploded view illustrating assembly of an intake system of an internal combustion engine in accordance with the present invention; and FIG. 10 is an exploded view illustrating assembly of a conventional intake system of an internal combustion engine.

DETAILED DESCRIPTION

Figure 1:
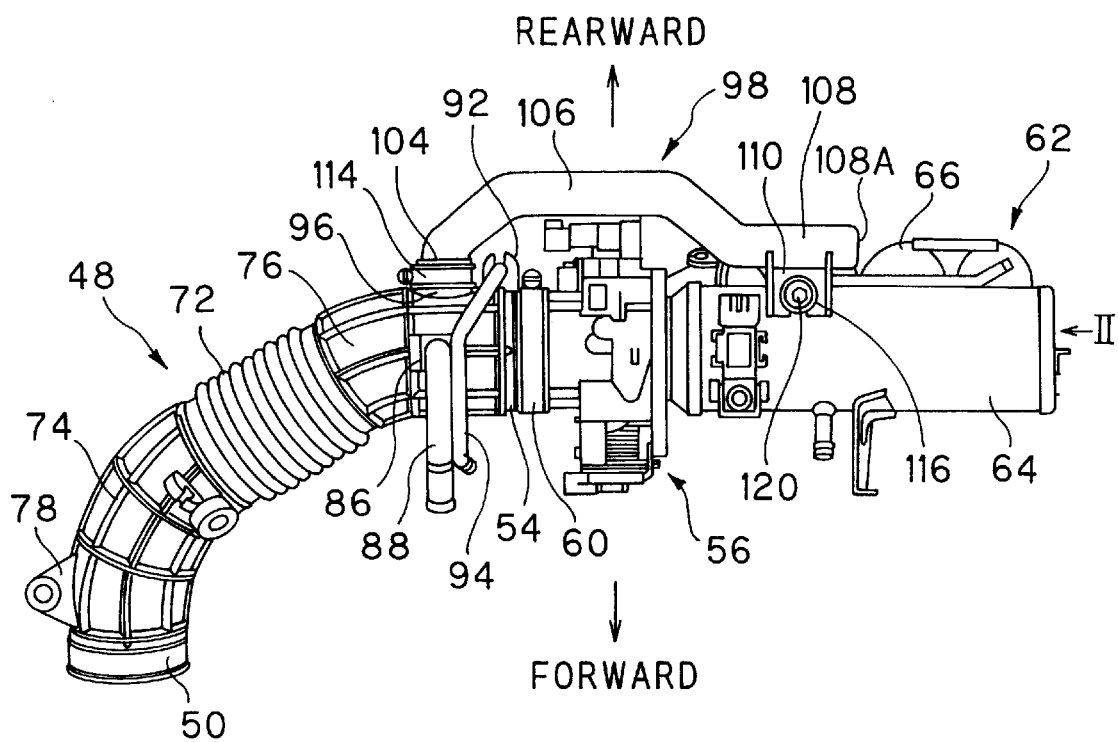
FIG. 1 is a plan view of the resonator construction for the internal combustion engine according to the present invention.

FIG. 1 to FIG. 9 show an embodiment of the present invention. In FIG. 9, reference numeral 2 designates a vehicle, 4 designates an apron panel, 6 designates an engine room or compartment, and 8 designates a space inside a vehicle fender.

The engine room 6 of the vehicle 2 is partitioned by the apron panel 4 as well as by a dash panel (not shown), each constituting part of a body of the vehicle 2, and the space 8 is formed between the apron panel 4 and a fender panel (not shown). The internal combustion engine 10 is positioned with its longitudinal direction extending in the lateral direction of the vehicle, and is placed in a horizontal posture in the engine room 6. That is, the engine 10 is horizontally mounted such that the crankshaft thereof is oriented generally transversely with respect to the longitudinal vehicle axis (i.e., front-to-back).

The internal combustion engine 10 has an air cleaner 12 connected thereto and provided in the engine room 6. The air cleaner 12 is fixed to an air cleaner bracket 14 affixed to an engine mount bracket (not shown in the figure) with an air cleaner fixing bolt 16.

The air cleaner 12 has a suction hose connecting section 18 provided at the upstream (i.e., input) side thereof, and has an outlet hose connecting section 20 provided at the downstream side thereof. Connected to the suction hose connecting section 18 is a cleaner connecting section 26 provided at the downstream end of an air suction hose 24. The air suction hose 24 is installed in the space 8 in the fender, and the suction hose connecting section 18 extends through a hole 22 formed in the apron panel 4.

The air suction hose 24 has a pipe connecting section 28 provided at the upstream end thereof. The pipe connecting section 28 is connected to a hose connecting section 32 located at the downstream end or side of an air suction pipe 30. The air suction pipe 30 has an opening 34 at the upstream end or side thereof which is open to air in the space 8 in the fender.

The air suction hose 24 has a resonator connecting section 36 provided at approximately the midpoint thereof. Connected to the resonator connecting section 36 is a resonator-side connecting section 40 of a resonator 38. The resonator 38 for the air suction hose is fixed to a resonator bracket 42 with a resonator band 44. The resonator bracket 42 is fixed to the apron panel 4 by a bracket fixing bolt 46.

At the opposite or downstream side of the air cleaner 12, a connecting section 50 at the upstream end of an air cleaner outlet hose 48 is connected to the outlet hose connecting section 20 provided at the downstream side of the air cleaner 12 by a cleaner connecting clip 52. The air cleaner outlet hose 48 has the cleaner connecting section 50 provided at the upstream end thereof, and also has a body connecting section 54 provided at the downstream end thereof.

The body connecting section 54 at the downstream end of the air cleaner outlet hose 48 is connected to a body-side connecting section 58 of a throttle body 56 by a body connecting clip 60. The throttle body 56 is connected to one edge or end of a surge tank 64 of an intake manifold 62 in the longitudinal direction thereof.

The intake manifold 62 is located at the rear side of the internal combustion engine 10 in the longitudinal direction of the vehicle 2, and the longitudinal axis of the surge tank 64 is oriented in the lateral direction of the vehicle (i.e. transverse to the longitudinal vehicle axis). Each branch pipe 66 of intake manifold 62 is connected to and communicates with the surge tank 64, which surge tank 64 is connected to the internal combustion engine 10 from the rear side of the engine 10 in the longitudinal direction of the vehicle. The surge tank 64 of the intake manifold 62 has a resonator fixing or mounting section 68 provided slightly backward or rearwardly on the upper side thereof, in which a resonator fixing hole 70 is located.

Figure 6:
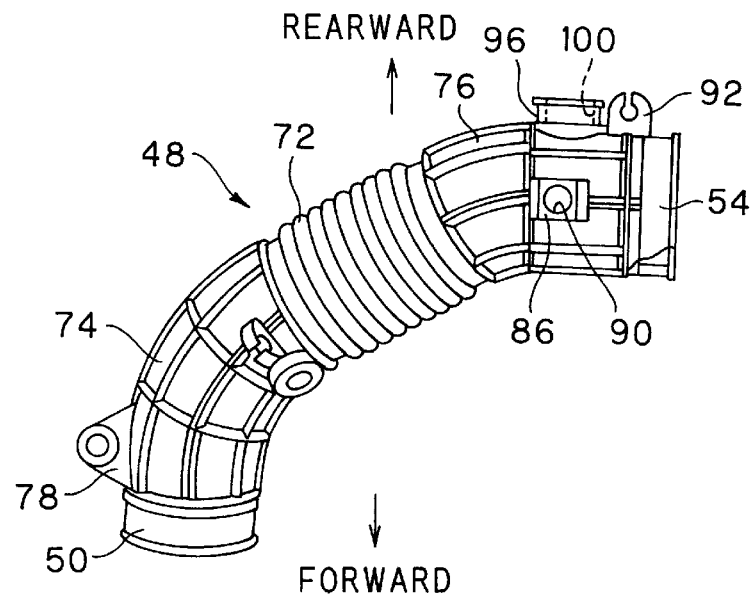
FIG. 6 is a plan view of the air cleaner outlet hose thereof.
Figure 7:
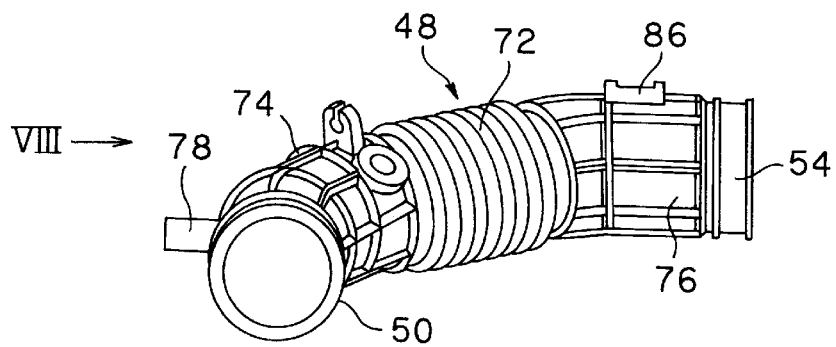
FIG. 7 is a front view of the air cleaner outlet hose thereof.
Figure 8:
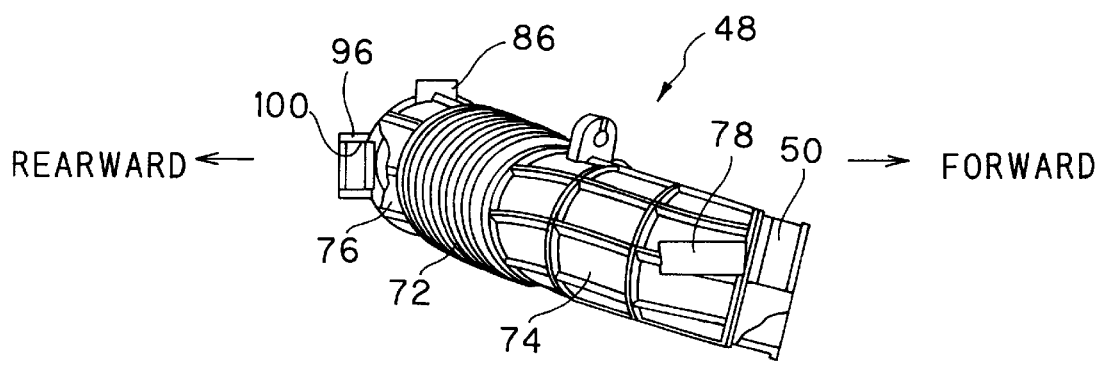
FIG. 8 is a side view of the air cleaner outlet hose thereof in the direction as indicated by the arrow VIII in FIG. 7.

The air cleaner outlet hose 48 has, as shown in FIG. 6 to FIG. 8, a bellows section 72 provided at a midsection thereof for absorbing vibrations propagated from the internal combustion engine 10. The air cleaner outlet hose 48 is also formed with an upstream-side hose section 74 upstream from bellows section 72 as well as a downstream-side hose section 76 downstream from bellows section 72.

The upstream-side hose section 74 is provided with a hose-side fixing section or mounting flange 78. As shown in FIG. 9, the hose-side fixing section 78 of the air cleaner outlet hose 48 is fixed to a hose bracket 80 with a hose fixing bolt 82. The hose bracket 80 is fixed to the apron panel 4 with bracket fixing bolts 84.

The downstream-side hose section 76 (FIGS. 6–8) includes a breather pipe connecting section 86. Connected to the breather pipe connecting section 86 is, as shown in FIG. 1, a breather pipe 88 for introducing blow-by gas into breather pipe connecting section 86. The breather pipe connecting section 86 is provided with a blow-by gas introducing hole 90 (FIG. 6). It should be noted that the reference numeral 92 in FIG. 1 indicates a pipe holding section or mounting bracket for securing a cooling water pipe 94 for cooling the breather pipe 88.

The downstream-side hose section 76 is also provided with a resonator connecting section 96. The resonator connecting section 96 is located at the rear side of the air cleaner outlet hose 48 relative to the longitudinal direction of the vehicle, and also rearwardly from the breather pipe connecting section 86. In other words, the resonator connecting section 96 is located rearwardly on the air cleaner outlet hose 48, and the breather pipe connecting section 86 is located generally at the top of the air cleaner outlet those 48 such that the resonator connecting section 96 and the breather pipe connecting section 86 are located at approximately the same axial position on hose 48 but at different circumferential positions thereon. A resonator communicating hole 100 is provided in the resonator connecting section 96.

Figure 3:
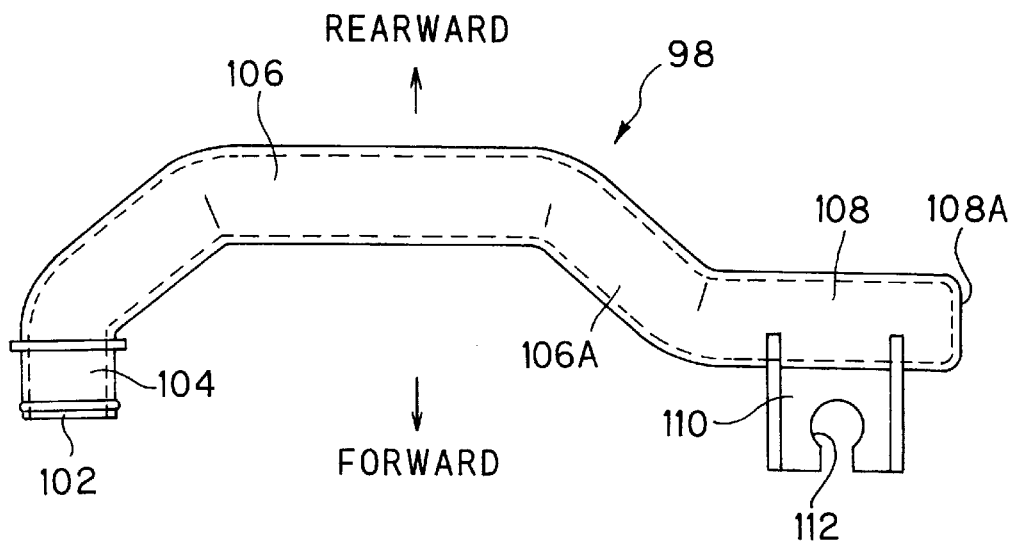
FIG. 3 is a plan view of the resonator thereof.
Figure 4:
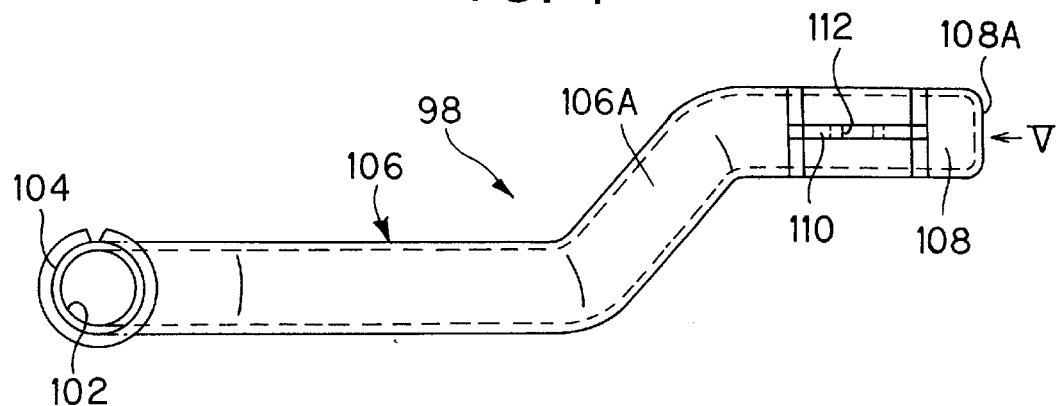
FIG. 4 is a front view of the resonator thereof.
Figure 5:
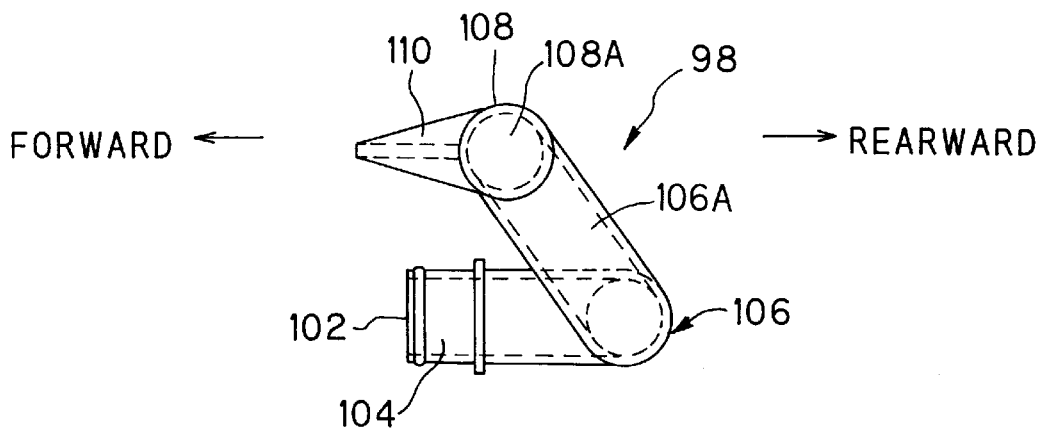
FIG. 5 is a side view of the resonator thereof in the direction as indicated by the arrow V in FIG. 4.

A resonator 98 (FIG. 9) is connected to the connecting section 96 and has, as shown in FIGS. 3 to 5, a connecting section 104 at one end thereof which is connected to the resonator connecting section 96. The connecting section 104 defines for communication with the hollow interior thereof, an opening 102 at one end of the resonator 98. Further, the resonator 98 includes an elongated intermediate section 106 which is bent in a generally U-shape and which extends along the rear side of the throttle body 56 (FIG. 1). The resonator 98 also has a fixing section or mounting flange 110 provided on a closed terminal end section 108 as defined at the other end of the resonator 98. A fixing or mounting hole 112 is provided in the mounting flange 110.

The resonator 98 is formed, as shown in FIGS. 1–5, as an elongate, hollow, pipelike member of generally cylindrical cross section, which member is open at one end (i.e. opening 102) and is closed at the other end by an end wall 108A. The bent U-shaped section 106 extends from the opening 102 at the one end of the resonator 98 to the midsection thereof and extends along the rear side of the throttle body 56. The end section 108 at the other end of resonator 98 extends at least partially along the upper side of the surge tank 64 and is mounted thereon.

The resonator 98, as shown in FIG. 9, has the resonator-side connecting section 104 at one end thereof connected to the resonator connecting section 96 provided at the rear end of the air cleaner outlet hose 48 by means of a clamp 114. The resonator mounting flange 110 adjacent the other end of the resonator 98 is fixed to mounting section 68 provided on the upper side of the surge tank 64 by a washer 118 and a fixing bolt 120 which extends through a cushion 116 (i.e., an elastomeric sleeve) which is positioned between the sections 110 and 68 and which functions as a floating member. The cushion 116 allows some movement between the resonator 98 and the surge tank 64.

The resonator 98 is inclined or angled upwardly as it extends from the opening 102 at one end thereof toward the end wall 108A at the other end thereof. Also, fixing the resonator mounting flange 110 to the fixing section 68 provided on the upper side of the surge tank 64 maintains the closed end section 108 of the resonator at an elevation above the inlet end section 104.

In the construction of the resonator 98 as shown in FIGS. 3–5, the upward inclination of the resonator 98 as it extends away from the opening 102 is accomplished due to a rear leg 106A of the bend U-shaped section 106 being inclined upwardly for connection to the end section 108, the latter being at a raised elevation relative to the connecting section 104.

When operating the internal combustion engine 10, air is taken in as intake air at the opening 34 at the upstream end of the air suction pipe 30 and is introduced to the air cleaner 12 through the air suction hose 24, and dust is removed from the intake air by the air cleaner 12. During operation, the intake air flowing through the air suction hose 24 is attenuated with its intake pulsing according to resonance of the resonator 38, so that the noise can be reduced.

The cleaned intake air (the dust having been removed by the air cleaner 12) is introduced to the throttle body 56 through the air cleaner outlet hose 48, the flow rate thereof being adjusted by a throttle valve (not shown), and the air then enters the surge tank 64 associated with the intake manifold 62 and is supplied to each cylinder (not shown) of the internal combustion engine 10 through the branch pipes 66. During operation, the intake air flowing through the air cleaner outlet hose 48 is attenuated with its intake pulsing according to resonance of the resonator 98, so that the noise can be reduced.

Figure 2:
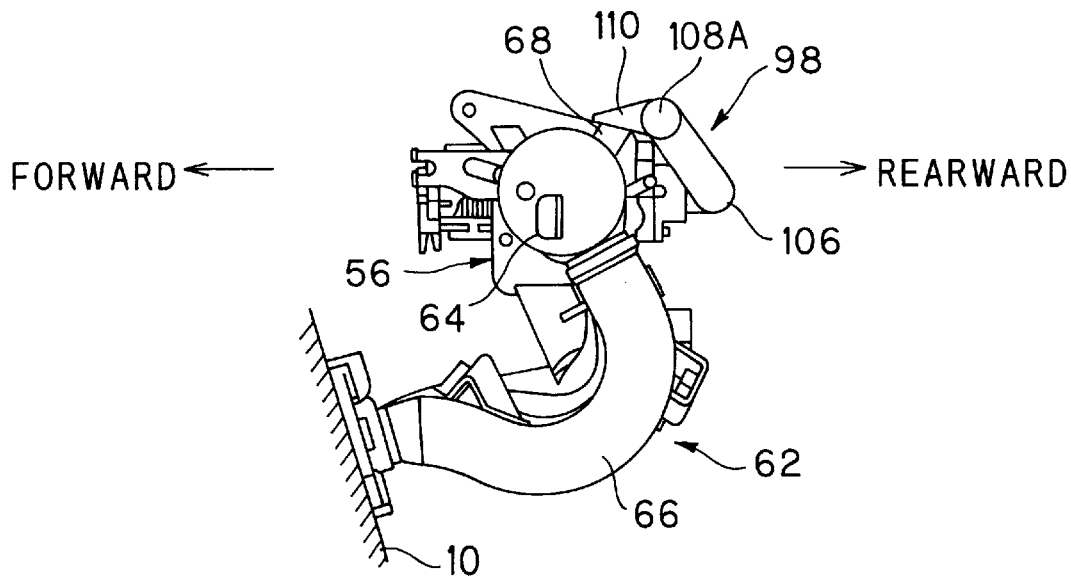
FIG. 2 is a side view thereof in the direction as indicated by the arrow II in FIG. 1.

The resonator 98, as shown in FIG. 1 and FIG. 2, is connected at the rear end of the air cleaner outlet hose 48 downstream from the bellows section 72, and also downstream from the breather pipe connecting section 86. With this feature, the resonator 98 can be located at the rear side of the air cleaner outlet hose 48 in a narrow and dead space within the engine compartment 6.

Also, the resonator 98 is formed of a cylindrical form with a substantially bent bottom section 106 so that the section 106 which extends from the opening 102 at the one end of the resonator 98 to the midsection thereof extends along the rear side of the throttle body 56, and the end section 108 at the other end of resonator 98 extends as far as the upper side of the surge tank 64 and is placed thereon.

The resonator 98 is provided by connecting the resonator-side connecting section 104 at the one end thereof to the resonator connecting section 96 located at the rear end of the air cleaner outlet hose 48, downstream from the bellows section 72, and also downstream from the breather pipe connecting section 86, and by fixing the resonator-side mounting flange 110 at the other end thereof to the fixing section 68 provided on the upper side of the surge tank 64 through the cushion 116 which acts as a resilient floating member. With this feature, the resonator 98 can be supported in a floating state on the surge tank 64 by the cushion 116.

Further, the resonator 98 is provided by connecting the resonator-side connecting section 104 to the resonator connecting section 96 provided at the rear end of the air cleaner outlet hose 48 so that the interior of the resonator 98 is placed at an upward angle as it extends from the opening 102 at one end thereof toward the section 108 at the other end thereof, and by fixing the resonator-side fixing section 110 to the fixing section 68 provided on the upper side of the surge tank 64.

With this feature, in this resonator construction, oil mist in the blow-by gas flowing into or entering the resonator 98 can be returned through the opening 102 and the resonator communicating hole 100 into the air cleaner outlet hose 48 due to the downward inclining portion of the resonator 98. The oil mist is thus prevented from remaining in the resonator 98, even though the resonator 98 is connected to the air cleaner outlet hose 48 adjacent or downstream from the breather pipe connecting section 86.

The resonator construction for the internal combustion engine 10 thus makes effective use of the dead space in the engine room 6 by locating the resonator 98 in dead space therein; the resonator 98 is protected from vibrations generated by the internal combustion engine 10 without comprising the effectiveness thereof; a change in frequency due to oil mist residue in the blow-by gas flowing into or entering the resonator 98 is prevented; and the resonator fully performs the function of reducing noise due to intake pulsing.

As described above, the resonator construction for this internal combustion engine according to the present invention permits a resonator to be located adjacent the rear side of an air cleaner outlet hose which is a dead space in an engine room, supports the resonator in a floating manner with respect to a surge tank through an intermediate floating member, returns oil mist in the blow-by gas flowing into the resonator 98 to the air cleaner outlet hose, and prevents oil mist in the resonator from remaining therein.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A resonator construction for an internal combustion engine horizontally oriented in an engine room of a vehicle, the resonator construction including a resonator; wherein an air cleaner outlet hose is provided and connected to a downstream side of an air cleaner; said air cleaner outlet hose is connected to a throttle body; said throttle body is connected to one end of a surge tank of an intake manifold provided at a rear side of the engine; the intake manifold having a plurality of branch pipes connected between said surge tank and said internal combustion engine; said resonator is located and connected to a rear side of said air cleaner outlet hose downstream from a bellows section of the air cleaner outlet hose and downstream from a breather pipe connecting section to which a breather pipe is connected; and said resonator is secured to an upwardly facing side of said surge tank.

2. A resonator construction for an internal combustion engine horizontally oriented in an engine room of a vehicle, the resonator construction including a resonator; wherein an air cleaner outlet hose is connected to a downstream side of an air cleaner; said air cleaner outlet hose is connected to a throttle body; said throttle body is connected to one end of a surge tank of an intake manifold provided at a rear side of the engine, the surge tank having a longitudinal axis which is oriented in the lateral direction of the vehicle; the intake manifold having a plurality of branch pipes connected between the surge tank and said internal combustion engine; and said resonator is located and connected to a rear side of said air cleaner outlet hose downstream from a bellows section of the air cleaner outlet hose and downstream from a breather pipe connecting section to which a breather pipe is connected, wherein said resonator has a generally cylindrical form and a substantially bent bottom section which extends from an opening at one end of the resonator to an intermediate section of the resonator and extends along a rear side of said throttle body, said resonator having an end section at the other end thereof which extends adjacent an upper side of said surge tank and is placed thereon, and a resonator-side connecting section provided at said one end and connected to a resonator connecting section located at the rear side of said air cleaner outlet hose downstream from the bellows section and downstream from the breather pipe connecting section, and a resonator-side fixing section provided at said end section at the other end and fixed to a fixing section provided on the upper side of said surge tank through a floating member.

3. A resonator construction for an internal combustion engine wherein a resonator-side connecting section of a resonator is secured to a rear side of an air cleaner outlet hose so that said resonator angles upwardly from an opening at one end thereof toward a closed section at the other end thereof, and a resonator-side fixing section of said resonator is fixed to a resonator fixing section provided on an upper side of a surge tank.

4. A resonator assembly for an internal combustion engine located in an engine room of a vehicle, said assembly comprising:

an air cleaner having an upstream end in communication with an air suction pipe for receiving air therein, and a downstream end;

an air cleaner outlet hose having an upstream end connected to said downstream end of said air cleaner and a downstream end associated with a throttle body, said air cleaner outlet hose also having a bellows portion disposed between said upstream and downstream ends thereof; and a resonator comprising an elongate hollow tubular member having one end connected to a rearwardly facing side of said air cleaner outlet hose between said bellows portion and said downstream end of said air cleaner outlet hose, said tubular member being closed at the other end thereof, and said tubular member including an elongate intermediate portion which is angled upwardly as it extends toward the closed end of the tubular member to permit blow-by gas oil mist to return to the air cleaner outlet hose.

5. The resonator assembly of claim 4 further including a breather pipe for carrying blow-by gas, said air cleaner outlet hose having a connector disposed thereon for fastening said breather pipe thereto, said resonator being connected to said outlet hose at a location which, in the flow direction through the outlet hose, is circumferentially adjacent or downstream of the connector for the breather pipe.

6. The resonator assembly of claim 4 wherein said assembly includes a surge tank associated with an intake manifold of the internal combustion engine, and the other end of said resonator is fastened to said upwardly facing side of said surge tank.

7. The resonator assembly of claim 4 wherein said intermediate portion of said resonator projects rearwardly and extends along a rearwardly facing side of the throttle body.

8. The resonator assembly of claim 7 wherein said resonator includes a second intermediate portion disposed between said first-mentioned intermediate portion and said closed end, said second intermediate portion extending at an angle forwardly from said first-mentioned intermediate portion.

9. The resonator assembly of claim 8 wherein said resonator includes an end portion extending generally horizontally between said second intermediate portion and said closed end, said end portion of said resonator mounted to an upwardly facing side of a surge tank of an intake manifold of the internal combustion engine.

10. A resonator assembly for an internal combustion engine located in an engine room of a vehicle such that a crankshaft of the engine is oriented generally transversely with respect to a longitudinal vehicle axis, said assembly comprising:

an air cleaner having an upstream end in communication with an air suction pipe for receiving air therein, and a downstream end;

an air cleaner outlet hose having an upstream end connected to said downstream end of said air cleaner and a downstream end associated with a throttle body, said air cleaner outlet hose also having a bellows portion disposed between said upstream and downstream ends thereof; and a resonator connected to a rearwardly facing side of said air cleaner outlet hose between said bellows portion and said downstream end of said air cleaner outlet hose, wherein a first end of said resonator is connected to said rearwardly facing side of said air cleaner outlet hose, and said assembly further includes a surge tank associated with an intake manifold of the internal combustion engine, said surge tank having a longitudinal axis oriented transversely with respect to the longitudinal vehicle axis and an upwardly facing side, and a second end of said resonator is fastened to said upwardly facing side of said surge tank by an elastic cushion member to allow relative floating movement therebetween.

\* \* \* \* \*